US007009495B2

(12) United States Patent
Hughes et al.

(10) Patent No.: US 7,009,495 B2
(45) Date of Patent: Mar. 7, 2006

(54) SYSTEM AND METHOD TO IDENTIFY MULTIPLE RFID TAGS

(75) Inventors: Michael A. Hughes, Pasco, WA (US); Richard M. Pratt, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 358 days.

(21) Appl. No.: 10/264,078

(22) Filed: Oct. 2, 2002

(65) Prior Publication Data

US 2004/0066281 A1    Apr. 8, 2004

(51) Int. Cl.
*H04Q 5/22*     (2006.01)
*H04J 3/16*     (2006.01)
*H04L 12/43*    (2006.01)

(52) U.S. Cl. ............... 340/10.2; 340/10.3; 340/10.31; 340/10.32; 370/437; 370/458

(58) Field of Classification Search .............. 340/10.2, 340/10.1, 10.42, 3.21, 10.4, 10.3, 10.31, 340/10.32; 370/442, 458
See application file for complete search history.

(56) References Cited

U.S. PATENT DOCUMENTS

| 4,075,632 | A | | 2/1978 | Baldwin et al. ............ 343/6.8 |
| 4,352,183 | A | | 9/1982 | Davis et al. ................ 371/33 |
| 4,360,810 | A | | 11/1982 | Landt ...................... 343/6.5 |
| 5,521,601 | A | | 5/1996 | Kandlur et al. ............. 342/42 |
| 5,530,702 | A | | 6/1996 | Palmer et al. ............. 370/85.3 |
| 5,550,547 | A | | 8/1996 | Chan et al. ................. 342/42 |
| 5,649,296 | A | | 7/1997 | MacLellan et al. ........ 455/38.2 |
| 5,686,902 | A | * | 11/1997 | Reis et al. ............... 340/10.2 |
| 5,777,561 | A | | 7/1998 | Chieu et al. ........... 340/825.54 |
| 5,850,187 | A | | 12/1998 | Carrender et al. ........ 340/10.6 |
| 5,883,582 | A | | 3/1999 | Bowers et al. ........ 340/825.54 |
| 5,940,006 | A | | 8/1999 | MacLellan et al. .... 340/825.54 |
| 5,986,570 | A | | 11/1999 | Black et al. ........... 340/825.54 |
| 5,995,019 | A | | 11/1999 | Chieu et al. ........... 340/825.54 |
| 6,002,344 | A | * | 12/1999 | Bandy et al. .............. 340/10.2 |
| 6,091,319 | A | | 7/2000 | Black et al. ............... 340/10.2 |
| 6,130,623 | A | | 10/2000 | MacLellan et al. .... 340/825.54 |
| 6,177,861 | B1 | | 1/2001 | MacLellan et al. ........ 340/10.1 |
| 6,236,315 | B1 | | 5/2001 | Helms et al. ............ 340/572.7 |
| 6,265,962 | B1 | | 7/2001 | Black et al. ............... 340/10.2 |
| 6,275,476 | B1 | * | 8/2001 | Wood, Jr. .................. 340/10.1 |
| 6,307,848 | B1 | | 10/2001 | Wood, Jr. .................... 370/329 |
| 6,366,260 | B1 | | 4/2002 | Carrender .................. 343/866 |
| 6,538,563 | B1 | * | 3/2003 | Heng ........................ 340/10.2 |
| 6,661,336 | B1 | * | 12/2003 | Atkins et al. .............. 340/10.2 |

(Continued)

OTHER PUBLICATIONS

Finkenzeller, Klaus, "Radio-Frequency identification Fundamentals and Applications", *RFID Handbook*, Chapter 8, pp. 151-158 (Jan. 2002).

(Continued)

*Primary Examiner*—Brian Zimmerman
*Assistant Examiner*—Clara Yang
(74) *Attorney, Agent, or Firm*—Woodard, Emhardt, Moriarty, McNett & Henry LLP

(57) ABSTRACT

An RFID system comprises an RFID reader configured to issue an RF command requesting that RF tags identify themselves, and to issue timing information defining a plurality of timeslots; and a plurality of RF tags in selective communication with the reader, the RF tags having respective IDs, respective tags being configured to randomly select a timeslot in which to reply to the RF command, and to issue an RF reply in response to the RF command in the randomly selected timeslot, the RF reply including a frequency pattern to assist in identifying the tag but not the tag's entire ID, different tags having different frequency patterns.

49 Claims, 5 Drawing Sheets

U.S. PATENT DOCUMENTS

2003/0214389 A1 * 11/2003 Arneson et al. ............ 340/10.2
2004/0046644 A1 * 3/2004 Bauhahn .................... 340/10.2

OTHER PUBLICATIONS

International Standard. ISO/IEC. "Part 2: Mechanisms Using Symmetry Encipherment Algorithms", *Information Technology—Security Techniques—Entity Authentication.* @ISO/IEC 9798-2:1999(E). 2nd Ed., pp 1-11 (Jul. 15, 1999).

Agilent Technologies. "Schottky Diode Voltage Doubler. Application Note 956-4", 2 pages (1999).

U.S. Appl. filed Oct. 2, 2002, entitled "Radio Frequency Identification Device Communications Systems, Wireless Communication Devices. Wireless Communication Systems. Backscatter Communication Methods, RAdi Frequency Identification Device Communication Methods and a Radio Frequency Identification Device", by Michael A. Hughes and Richard M. Pratt.

U.S. Appl. filed Oct. 2, 2002, entitled "Method of Simultaneously Reading Multiple RAdio Frequency Tags, RF Tag, and RF Reader", by Emre Ertin, Richard M. Pratt, Michael A. Hughes, Kevin L. Priddy and Wayne M. Lechelt.

U.S. Appl. filed Oct. 2, 2002, entitled "RFID System and Method Including Tag ID Compression", by Michael A. Hughes and Richard M. Pratt.

U.S. Appl. filed Oct. 2, 2002, entitled "Radio Frequency Identification Devices, Backscatter Communication Device Wake-Up Methods, Communication Device Wake-Up Methods and a Radio Frequency Identification Device Wake-Up Method", by Richard M. Pratt and Michael A. Hughes.

U.S. Appl. filed Oct. 2, 2002, entitled "Wireless Communication Systems. RAdio Frequency Identification Devices. Methods of Enhancing a Communications Range of a Radio Frequency Identification Device, and Wireless Communication Methods". by Richard M. Pratt and Steven B. Thompson.

U.S. Appl. filed Oct. 2, 2002, entitled "Wireless Communications Devices, Methods of Processing a Wireless Communication Signal, Wireless Communication Synchronization Methods and a Radio Frequency Identification Device Communication Method", by Richard M. Pratt and Steven B. Thompson.

U.S. Appl. filed Oct. 2, 2002, entitled "Wireless Communications Systems, Radio Frequency Identification Devices, Wireless Communications Methods, and Radio Frequency Identification Device Communications Methods", by Richard M. Pratt and Steven B. Thompson.

U.S. Appl. filed Oct. 2, 2002, entitled "A Challenge-Based Tag Authentication Model", by Michael A. Hughes and Richard M. Pratt.

* cited by examiner

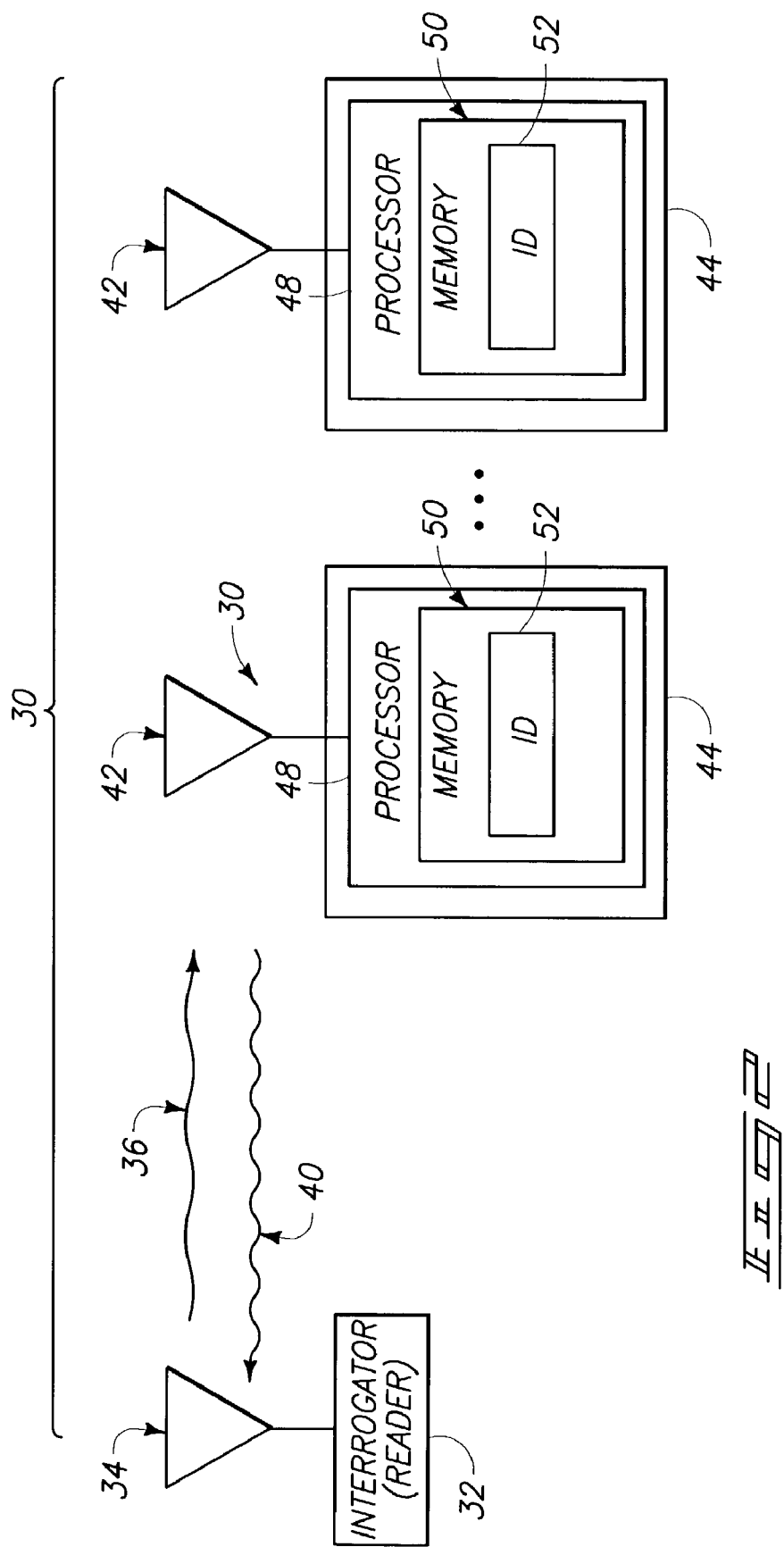

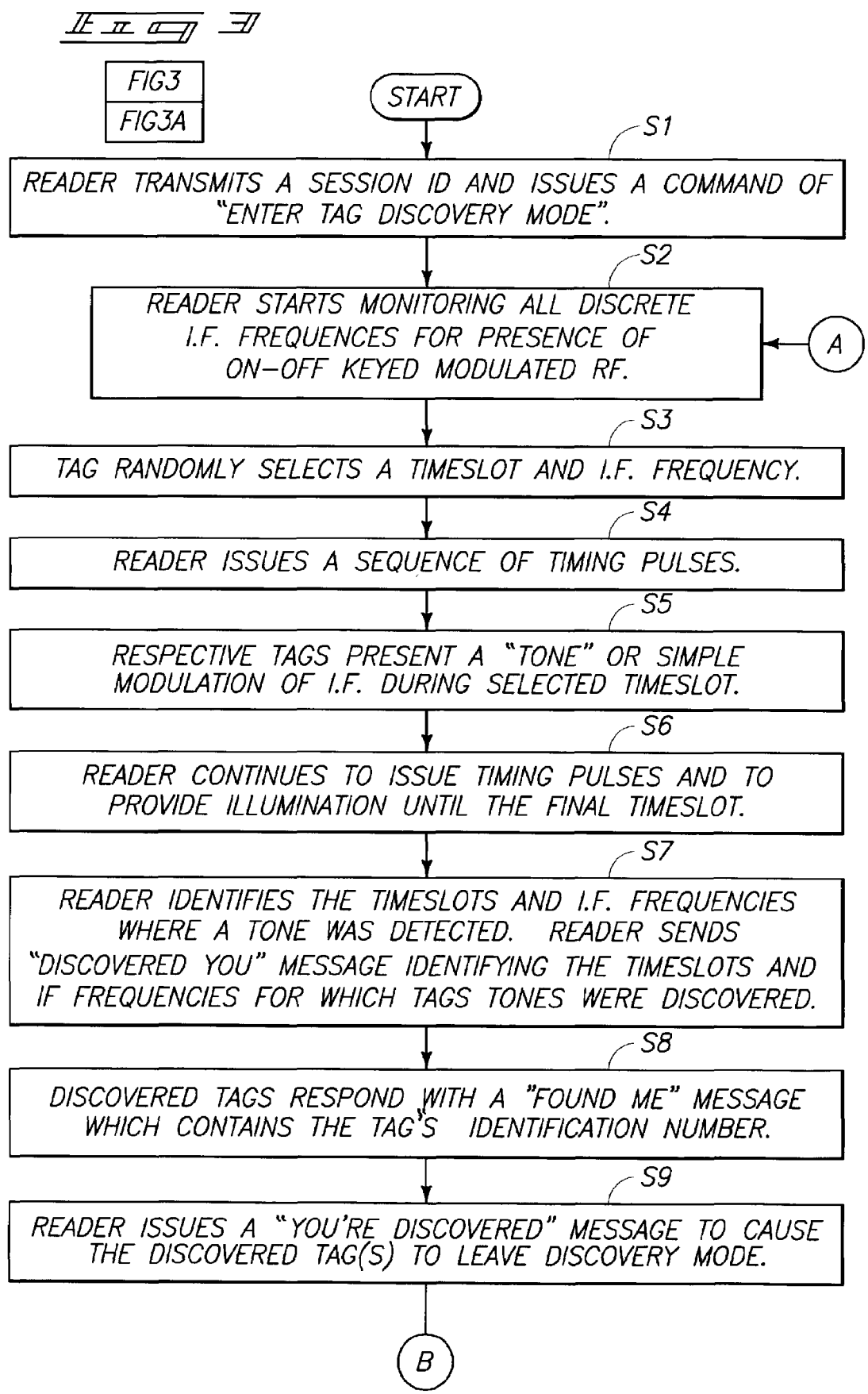

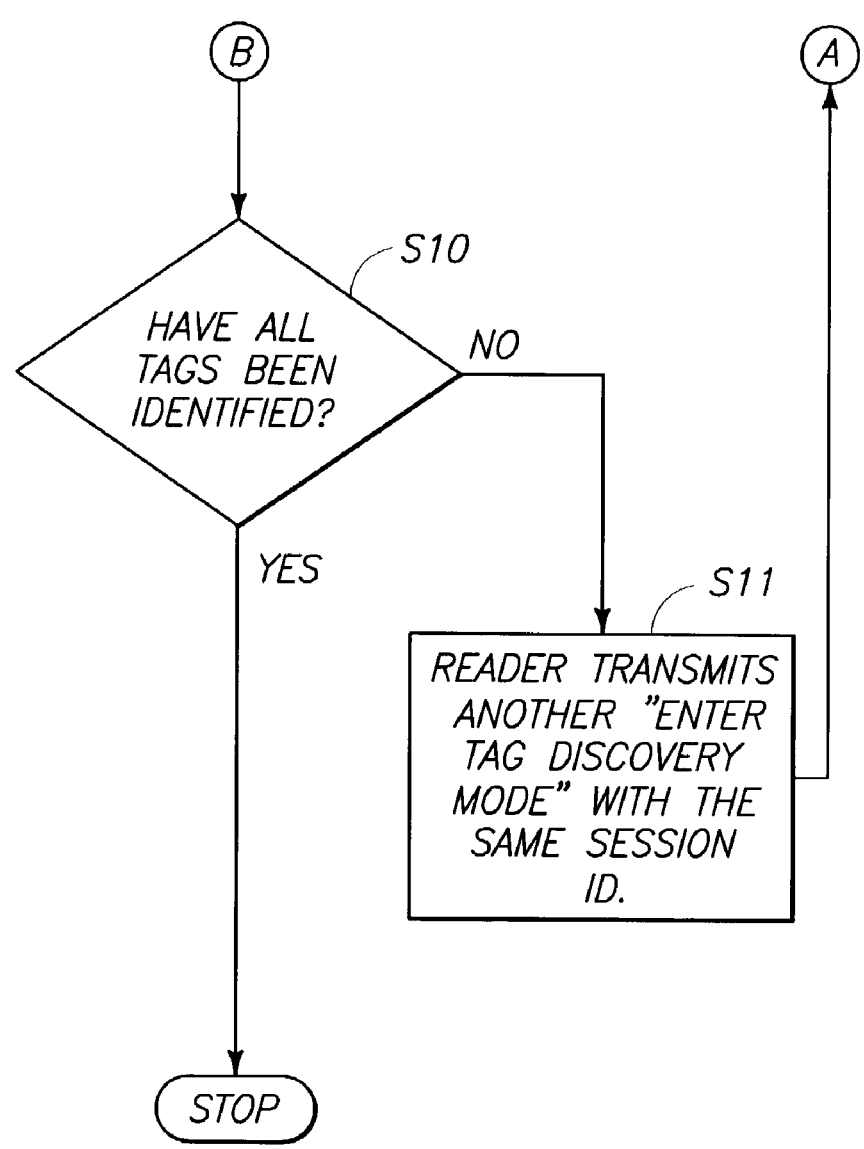

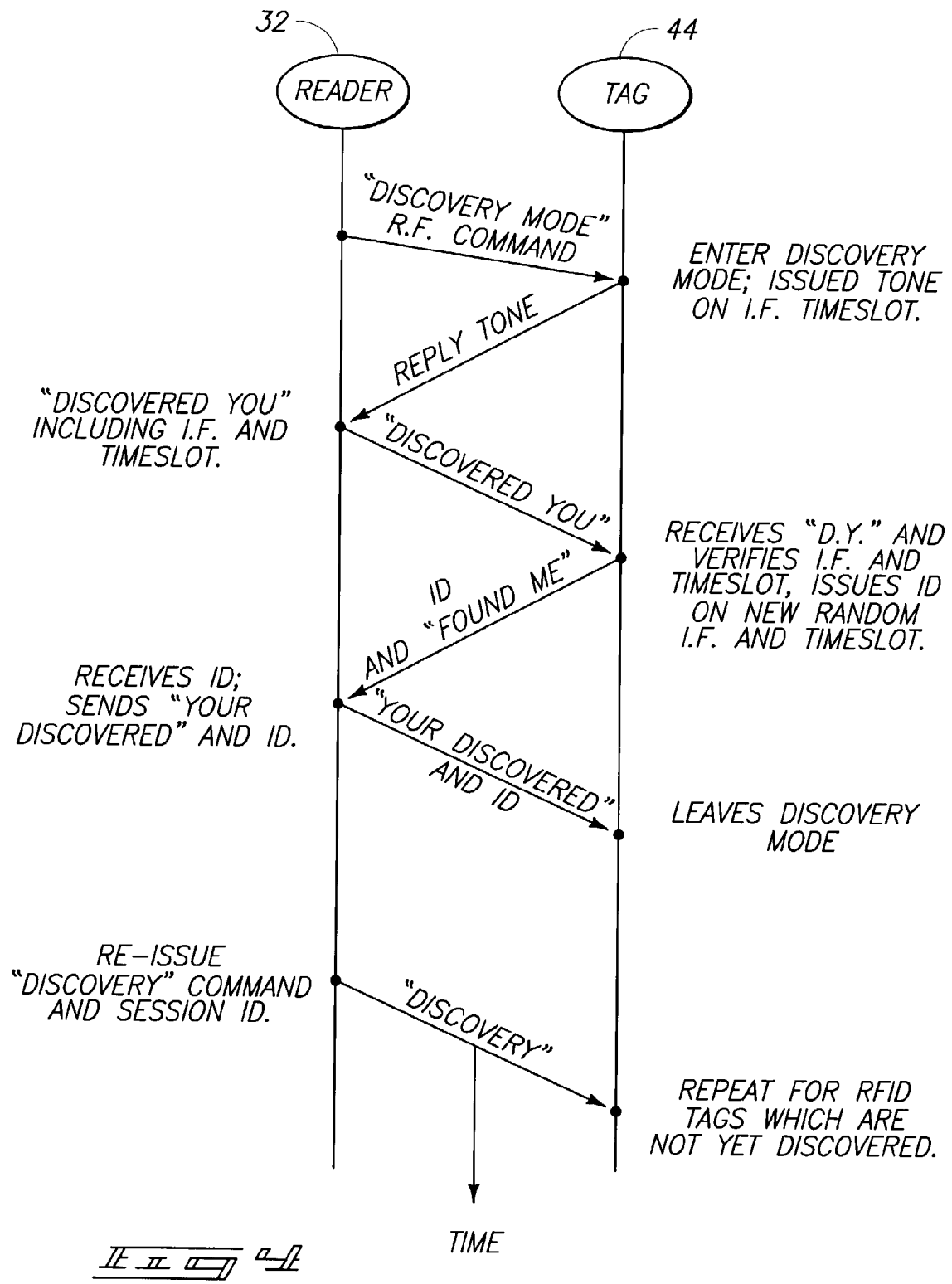

SYSTEM AND METHOD TO IDENTIFY MULTIPLE RFID TAGS

TECHNICAL FIELD

The invention relates to a remote communication system. More particularly, the invention relates to a radio frequency (RF) identification system and methods for rapidly identifying RF tags.

BACKGROUND OF THE INVENTION

Remote communication utilizing wireless equipment typically relies on radio frequency (RF) technology, which is employed in many industries. One application of RF technology is in locating, identifying, and tracking objects, such as animals, inventory, and vehicles.

RF identification (RFID) tag systems have been developed to identify, monitor, or control remote objects. As shown in FIG. 1, a basic RFID system 10 includes an interrogator 18 and transponders (commonly called RF tags) 16. The interrogator 18 includes a transceiver 14 and an antenna 12. The tag 16 includes a transceiver 15 and an antenna 24. In operation, the antenna 12 emits and receives electromagnetic radio signals generated by the transceiver 14 to activate the tag 16, and receive signals from the tag. When the tag 16 is activated, data can be read from or written to the tag.

In some applications, the transceiver 14 and antenna 12 are components of an interrogator (or reader) 18, which can be configured either as a hand-held or a fixed-mount device. The interrogator 18 emits the radio signals 20 in range from one inch to one hundred feet or more, depending upon its power output, the radio frequency used, and other radio frequency considerations. When an RF tag 16 passes through the electromagnetic radio waves 20, the tag detects the signal 20 and is activated. Data encoded in the tag 16 is then transmitted by a modulated data signal 22 through an antenna 24 to the interrogator 18 for subsequent processing.

An advantage of RFID systems is the non-contact, non-line-of-sight capability of the technology. Tags can be read through a variety of substances such as snow, fog, ice, paint, dirt, and other visually and environmentally challenging conditions where bar codes or other optically-read technologies would be useless. RF tags can also be read at remarkable speeds, in most cases responding in less than one hundred milliseconds.

There are three main categories of RFID tag systems. These are systems that employ beam-powered passive tags, battery-powered semi-passive tags, and active tags. Each operates in fundamentally different ways. The invention described below in the Detailed Description can be embodied in any of these types of systems.

The beam-powered RFID tag is often referred to as a passive device because it derives the energy needed for its operation from the radio frequency energy beamed at it. The tag rectifies the field and changes the reflective characteristics of the tag itself, creating a change in reflectivity (RF cross-section) that is seen at the interrogator. A battery-powered semi-passive RFID tag operates in a similar fashion, modulating its RF cross-section in order to change its reflectivity that is seen at the interrogator to develop a communication link. Here, the battery is the only source of the tag's operational power. Finally, in the active RFID tag, both the tag and reader have transceivers to communicate and are powered by a battery.

A typical RF tag system 10 will contain at least one tag 16 and one interrogator 18. The range of communication for such tags varies according to the transmission power of the interrogator 18 and the tag 16. Battery-powered tags operating at 2,450 MHz have traditionally been limited to less than ten meters in range. However, devices with sufficient power can reach in excess of 100 meters in range, depending on the frequency and environmental characteristics.

Conventional RF tag systems utilize continuous wave backscatter to communicate data from the tag 16 to the interrogator 18. More specifically, the interrogator 18 transmits a continuous-wave radio signal to the tag 16, which modulates the signal 20 using modulated backscattering wherein the electrical characteristics of the antenna 24 are altered by a modulating signal from the tag that reflects a modulated signal 22 back to the interrogator 18. The modulated signal 22 is encoded with information from the tag 16. The interrogator 18 then demodulates the modulated signal 22 and decodes the information.

Conventional continuous wave backscatter RF tag systems utilizing passive (no battery) RF tags require adequate power from the signal 20 to power the internal circuitry in the tag 16 used to modulate the signal back to the interrogator 18. While this is successful for tags that are located in close proximity to an interrogator, for example less than three meters, this may be insufficient range for some applications, for example greater than 100 meters.

A problem in RFID systems is in the rapid identification of an unknown number and identity of tags with long IDs in the field of view of the reader.

SUMMARY OF THE INVENTION

The invention provides An RFID system comprising an RFID reader configured to issue an RF command requesting that RF tags identify themselves, to issue timing information defining a plurality of timeslots; and a plurality of RF tags in selective communication with the reader, the RF tags having respective IDs, respective tags being configured to randomly select a timeslot in which to reply to the RF command, and to issue an RF reply in response to the RF command in the randomly selected timeslot, the RF reply including a frequency pattern to assist in identifying the tag but not the tag's entire ID, different tags having different frequency patterns.

Another aspect of the invention provides an RFID reader, for use with RF tags that have respective IDs, the RFID reader comprising circuitry configured to selectively provide a backscatter RF illumination field, to provide time synchronization information defining timeslots to RF tags, to issue a first RF command requesting that RF tags identify themselves, to store the identity of the timeslot where an RF reply was received by the reader from a tag, to determine if a collision occurred between RF replies, to issue a second RF command indicating the timeslot for which a reply was received from an RF tag and requesting that RF tags reply with their IDs, to receive and store IDs from RF tags, and to re-issue the first RF command response if it was determined that a collision occurred between RF replies.

Another aspect of the invention provides an RFID tag for use with a reader that is configured to issue timing signals defining timeslots, the RFID tag comprising circuitry configured to store an ID identifying the tag, to backscatter modulate an RF illumination field from a reader, to randomly select a timeslot in which to reply from a plurality of possible timeslots, to issue an RF reply in the selected timeslot, responsive to receiving a first RF command including a session identifier from the reader, the reply including a signal pattern, the signal pattern identifying the tag but not including the entire ID, the tag being further configured to issue a response to the reader including the tag's ID in response to receiving a second RF command from the reader indicating that the tag has been found by the reader, and the circuitry being further configured to ignore further receptions of the first RF command which include the session identifier responsive to receiving a third RF command from the reader confirming that the tag's ID has been received by the reader.

Yet another aspect of the invention provides an RFID communications method comprising providing an RF reader; providing a plurality of RF tags in selective communication with the reader, the RF tags having respective IDs; issuing, using an RF reader, an RF command requesting that RF tags identify themselves; issuing, using the RF reader, timing information defining a plurality of timeslots; respective tags randomly selecting a timeslot in which to reply to the RF command; and respective tags issuing an RF reply in response to the RF command, in the randomly selected timeslot, the RF reply including a frequency pattern to assist in identifying the tag but not the tag's entire ID, different tags having different frequency patterns.

Another aspect of the invention provides a method of communicating with RF tags that have respective IDs, the method comprising selectively providing a backscatter RF illumination field, including time synchronization information defining timeslots to RF tags; issuing a first RF command requesting that RF tags identify themselves; storing data identifying the timeslot where an RF reply was received from a tag; determining if a collision occurred between RF replies; issuing a second RF command indicating the timeslot for which a reply was received from an RF tag and requesting that RF tags reply with their IDs; receiving and storing IDs from RF tags; and re-issuing the first RF command response if it was determined that a collision occurred between RF replies received from tags.

Still another aspect of the invention provides a method of communicating with an RF reader that is configured to issue timing signals defining timeslots, the method comprising storing an ID; backscatter modulating an RF illumination field from the reader; randomly selecting a timeslot in which to reply from a plurality of possible timeslots; issuing an RF reply in the selected timeslot, responsive to receiving a first RF command, including a session identifier, from the reader, the reply including a signal pattern, the signal pattern identifying the tag but not including the entire ID; issuing a response to the reader including the ID in response to receiving a second RF command from the reader; and ignoring further receptions of the first RF command which include the session identifier responsive to receiving a third RF command from the reader confirming that the ID has been received by the reader.

Another aspect of the invention provides a method of using an RFID reader, comprising issuing a first RF command to an RF tag; selectively providing an RF illumination field including time synchronization pulses; monitoring for a reply during a period defined by a predetermined number of timeslots; receiving an RF reply, from a tag, including a signal pattern during the monitoring; issuing a second RF command indicating the timeslot during which a reply was received; receiving an RF reply including a tag's ID in response to the second RF command; and issuing a third RF command in response to receiving an RF reply including a tag's ID.

Still another aspect of the invention provides an RFID system comprising an RFID reader including means for issuing an RF command requesting that RF tags identify themselves, means for issuing timing information defining a plurality of timeslots, and means for monitoring a plurality of intermediate frequencies for a response; and a plurality of RF tags in selective communication with the reader, the RF tags having respective IDs, respective tags including means for randomly selecting a timeslot in which to reply to the RF command, means for randomly selecting an intermediate frequency on which to issue a reply to the RF command, and means for issuing an RF reply in response to the RF command in the randomly selected timeslot and using the randomly selected intermediate frequency, the RF reply including a frequency pattern to assist in identifying the tag but not the tag's entire ID, different tags having different frequency patterns.

BRIEF DESCRIPTION OF THE DRAWINGS

Preferred embodiments of the invention are described below with reference to the following accompanying drawings.

FIG. 2 is a block diagram of an RFID communication system, including a tag and reader, embodying various aspects of the invention.

FIGS. 3–3A provide a flowchart illustrating operation of the reader and tag in accordance with one embodiment of the invention.

FIG. 4 is a diagram illustrating communications between the reader and tag in accordance with one embodiment of the invention.

DETAILED DESCRIPTION OF THE PREFERRED EMBODIMENTS

Figure 1:
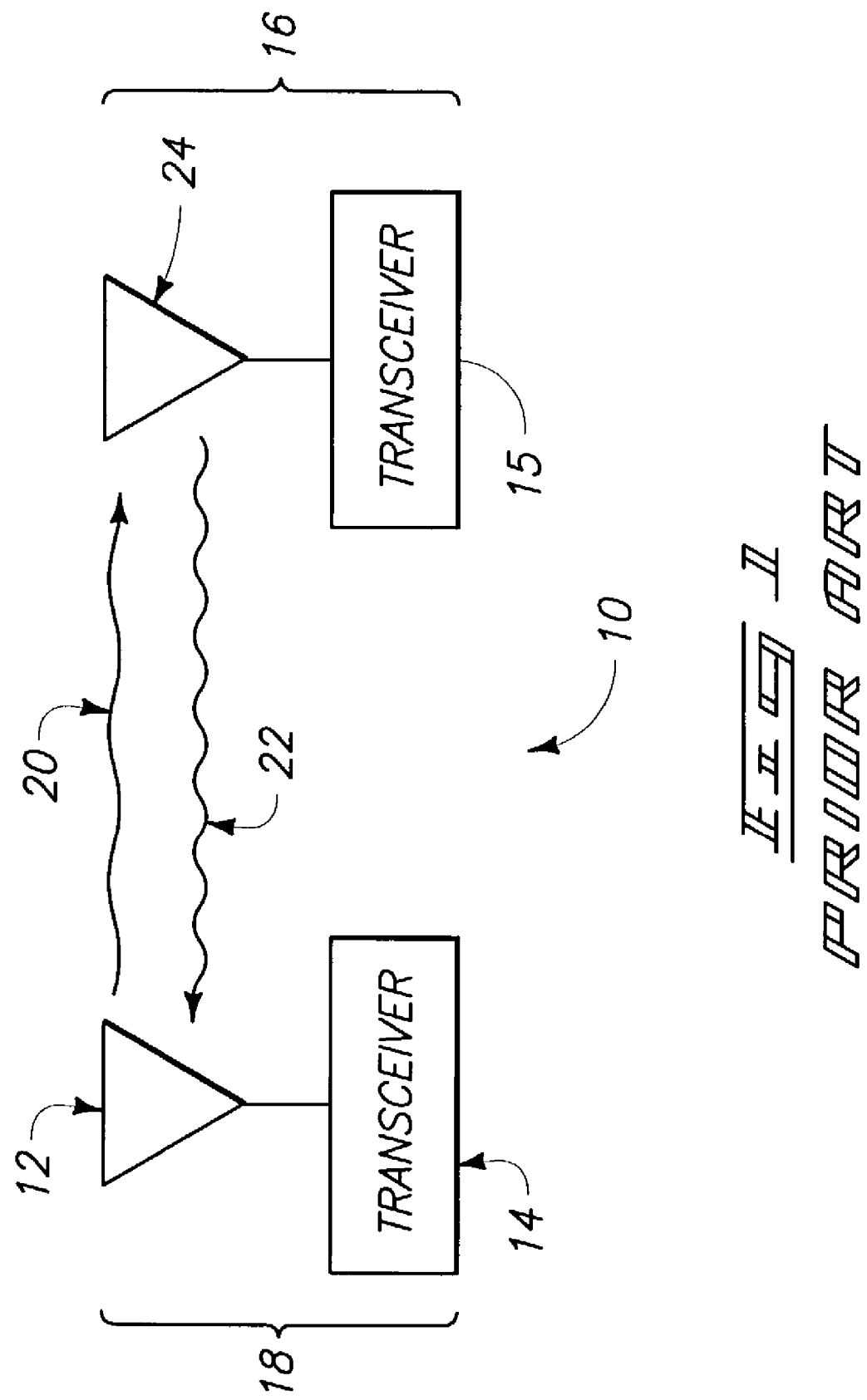
FIG. 1 is a block diagram of a conventional RFID communication system, including a tag and reader in which the invention could be incorporated.

Attention is directed to the following commonly assigned applications, which are incorporated herein by reference: U.S. patent application Ser. No. 10/263,826 entitled "Radio Frequency Identification Device Communication Systems, Wireless Communication Devices, Backscatter Communication Methods and Radio Frequency Identification Device Communication Methods" by inventors Mike A. Hughes and Richard M. Pratt; U.S. patent application Ser. No. 10/263,809, entitled "Method of Simultaneously Reading Multiple Radio Frequency Tags, RF Tag, and RF Reader", by inventors Emre Ertin, Richard M. Pratt, Mike A. Hughes, Kevin L. Priddy, and Wayne M. Lechelt; U.S. patent application Ser. No. 10/263,873, entitled "RFID System and Method Including Tag ID Compression", by inventors Mike A. Hughes and Richard M. Pratt; U.S. patent application Ser. No. 10/263,940, entitled "Wireless Communication Devices, Radio Frequency Identification Devices, Backscatter Communication Device Wake-Up Methods and Radio Frequency Identification Device Wake-Up Methods", by inventors Richard Pratt and Mike Hughes; U.S. patent application Ser. No. 10/263,997, entitled "Wireless Communication Systems, Radio Frequency Identification Devices, Methods of Enhancing a Range of Radio Frequency Device, and Wireless Communication Methods", by inventors Richard Pratt and Steven B. Thompson; U.S. patent application Ser. No. 10/263,670, entitled "Wireless Communications Devices, Methods of Processing a Wireless Communication Signal, Wireless Communication. Synchronization Methods and a Radio Frequency Identification Device Communication Method", by inventors Richard M. Pratt; U.S. patent application Ser. No. 10/263,656, entitled "Wireless Communications Systems, Radio Frequency Identification Devices, Wireless Communications Methods, and Radio Frequency Identification Device Communications Methods", by inventors Richard Pratt and Steven B. Thompson; U.S. patent application Ser. No. 10/263,635, entitled "A Challenged-Based Tag Authentication Model, by inventors Mike A. Hughes" and Richard M. Pratt; U.S. patent application Ser. No. 09/589,001, filed Jun. 6, 2000, entitled "Remote Communication System and Method", by inventors R. W. Gilbert, G. A. Anderson, K. D. Steele, and C. L. Carrender; U.S. patent application Ser. No. 09/802, 408; filed Mar. 9, 2001, entitled "Multi-Level RF Identification System"; by inventors R. W. Gilbert, G. A. Anderson, and K. D. Steele; U.S. patent application Ser. No. 09/833, 465, filed Apr. 11, 2001, entitled "System and Method for Controlling Remote Device", by inventors C. L. Carrender, R. W. Gilbert, J. W. Scott, and D. Clark; U.S. patent application Ser. No. 09/588,997, filed Jun. 6, 2000, entitled "Phase Modulation in RF Tag", by inventors R. W. Gilbert and C. L. Carrender; U.S. patent application Ser. No. 09/589, 000, filed Jun. 6, 2000, entitled "Multi-Frequency Communication System and Method", by inventors R. W. Gilbert and C. L. Carrender; U.S. patent application Ser. No. 09/588, 998; filed Jun. 6, 2000, entitled "Distance/Ranging by Determination of RF Phase Delta", by inventor C. L. Carrender; U.S. patent application Ser. No. 09/797,539, filed Feb. 28, 2001, entitled "Antenna Matching Circuit", by inventor C. L. Carrender; U.S. patent application Ser. No. 09/833,391, filed Apr. 11, 2001, entitled "Frequency Hopping RFID Reader", by inventor C. L. Carrender.

As shown in FIG. 2, an embodiment of the present invention is directed to an RF communication system 30 that employs backscatter signals. The RF communication system 30 includes a reader or interrogator 32 that includes an antenna 34 through which the reader 32 can transmit an interrogation signal 36 to an RF tag 44. The RF tag modulates the continuous wave interrogation signal 36 to produce a backscatter response signal 40 that is transmitted back to the reader 32. The signal 40 can include an identification code stored in memory 50, or other data. While FIG. 2 shows only two tags 44, there would typically be multiple tags 44 in use, capable of communicating with the reader 32.

The embodiment shown in FIG. 2, the RF tag 44 includes an antenna 42 coupled to a modulator defined by processor 48. The tag 44 includes a switch coupled between the antenna 42 and processor 48. In the embodiment of FIG. 2, the switch is included in the processor 48. Alternatively, the switch can be a switch external to the processor 48, such as an n-channel MOS transistor, a p-channel MOS transistor, a bi-polar transistor, or any of numerous other types of switches.

In FIG. 2, a modulating signal from the processor 48 is input to the antenna 42 to cause the antenna to alternately reflect or not reflect. One item that can be transmitted from the tag to the reader 32 is an identification code (ID) 52 that is stored in memory 50 of the RF tag 44. More particularly, each tag 44 includes a unique ID 52. In one embodiment, the unique ID is a permanent ID. In another embodiment, the ID is temporary, or the tag includes both a permanent and a temporary ID. The ID is defined by a memory, or could be defined by fusible links, for example. In one embodiment, after receiving a command, the reader 32 sends a carrier wave or interrogation signal 36 that is received by the antenna 42, and that signal is selectively reflected or not reflected back by the antenna 42 by the tag 44 shorting or not shorting dipole halves of the antenna 42 to produce portions of the response signal 40 (backscatter communications). Other communication methods are possible.

It will be appreciated that the depiction of the RF tag 44 in FIG. 2 is one embodiment only; RFID tags are well-known in the art. For example, U.S. Pat. No. 4,075,632 to Baldwin et al., which is incorporated herein by reference, discusses in detail circuit structures that could be used to produce the RF tag 44, if modified as described below.

Similarly, the internal structures of the reader 32 are not shown in FIG. 2. For example, the reader 32 can be the receiver described in U.S. Pat. No. 4,360,810 to Landt, which is incorporated herein by reference, modified as described below.

One aspect of the invention provides a method and apparatus to minimize the communications required to identify or discover multiple RFID tags in the reader's field of view. One aspect of the invention is particularly advantageous, for example, for the case of a significant number of unknown tags in the reader's field of view and where each tag possesses a long permanent ID number. These long identification numbers cause the tags to have a very large address space, so a linear address search of the address space is not realistic.

In the illustrated embodiment, each RFID tag has the capability to reply on any of a number of intermediate frequencies; other embodiments are possible. For example, in one embodiment, the tags can generate replies at intermediate frequencies of 16 KHz, 32 KHz, and 56 KHz. Other alternatives are possible. The method and apparatus does not require, but can benefit from, a read while write reader (reader which can send commands to one tag concurrent with reading a response from another tag). An advantage of this method is that a simple tag response is all that is required for the reader to gain information about a tag's identity. The tag does not need to present its entire ID. The tag's response can be very fast—possibly as short as a bit or symbol time. This feature allows the reader to gain important identity information about the tags within its field of view very rapidly. A TONE is any frequency or frequency pattern generated in a tag 44 that the reader 32 can recognize during a timeslot to determine that a tag 44 is responding. A timeslot is an interval controlled by the reader during which the tag responds. A simple tag response is all that is required for the reader 32 to gain information about a tag's identity—the tag does not need to present its entire ID. The reader 32 is merely looking for the presence or absence of the TONE in a time or frequency slot. In this embodiment, the multiple IF channels can still be used but instead of responding back with an entire ID, a tag responds with a tone that can be correlated to its ID.

FIG. 3 illustrates the concept for a reader 32 which cannot simultaneously read and issue commands. A discussion of the improved version of the method for an improved reader 32 design for simultaneous read/write operation appears after the discussion of FIG. 3.

In step S1, the reader 32 issues a command of ENTER TAG DISCOVERY MODE and, in one embodiment, transmits a session ID.

In step S2, the reader 32 starts monitoring all discrete IF frequencies for presence of replies, such as in the form of On-Off Keyed modulated RF or other modulated RF.

In step S3, the tag 44 randomly selects a timeslot and IF frequency that it will use during the current discovery session. For example, see commonly assigned U.S. patent application, Ser. No. 10/263,809, titled "Method of Simultaneously Reading Multiple Radio Frequency Tags, RF Tag, and RF Reader", by inventors Emre Ertin, Richard M. Pratt, Mike A. Hughes, Kevin L. Priddy, and Wayne M. Lechelt, which is incorporated herein by reference.

In step S4, the reader 32 issues a sequence of timing pulses (which could be, for example, the brief removal of RF illumination) to provide timeslot synchronization to the individual tags. In one embodiment, the timeslots are 100 milliseconds wide; other embodiments are possible.

In step S5, the tags 44 which are in communication range present a TONE or very simple modulation of their IF return frequencies during that timeslot. In one embodiment, each tag 44 uses a TONE instead of its entire identification number as described in U.S. patent application, Ser. No. 10/263,809 incorporated by reference and entitled "Method of Simultaneously Reading Multiple Radio Frequency Tags, RF Tag, and RF Reader".

The reader 32 continues to issue timing pulses and to provide illumination until the final timeslot, and then discontinues illumination, in step S6.

In step S7, the reader 32 identifies (e.g., stores in memory) the timeslots and IF frequencies where TONEs were detected, and sends DISCOVERED YOU messages identifying the timeslots and IF frequencies where the tags' TONEs were discovered. In other words, the reader 32 transmits the timeslot and IF identifier to each discovered tag 44. There will be cases where TONEs from multiple tags occur within the same timeslot and collide.

In step S8, each discovered tag 44 responds with a FOUND ME message, which contains the tag's ID (identification number).

In step S9, the reader 32 issues a YOU'RE DISCOVERED message to cause the tags to leave discovery mode.

More particularly, in step S10, the reader determines whether all tags 44 have been identified. If so, the process ends; if not, the process proceeds to step S11.

In step S11, the reader 32 will transmit another ENTER TAG DISCOVERY MODE with the same session ID, and process will repeat at step S2. The process is repeated until no TONES remain, meaning that all tags have been identified, and have left DISCOVERY MODE.

An embodiment similar to that of FIG. 3 is illustrated in an alternative format in FIG. 4, to better illustrate steps performed by the reader and steps performed by the tags.

The use of timeslots alone with the tag 44 presenting a TONE (modulated IF) during a randomly chosen timeslot will allow a fast acquisition. See U.S. patent application, Ser. No. 10/263,809 incorporated above entitled "Method of Simultaneously Reading Multiple Radio Frequency Tags, RF Tag, and RF Reader".

One embodiment involves the use of a reader which reads while writing. The use of a simultaneous read-write tag system allows overlapping the DISCOVERED YOU messages with the FOUND ME responses from the tags. This speeds up the tag acknowledgment process and thus reduces the time to identify and acknowledge large numbers of tags.

Potential applications include applications sensitive to rapidly identifying a large number of RF tags in as short a period of time as possible. To better illustrate how the tags are envisioned for usage, application areas that the inventors envisage, for example, Inventory Management, Process Monitoring, Process Control, Diagnostics, and Security.

Inventory management incorporates a wide variety of situations where RFID tags can be used. These situations include the simple inventory/locating task of critical or high value items in storage, transport, or final use locations. Speeding up the process of identifying large numbers of tagged items greatly increases the speed at which the customer's inventory management system can operate.

The addition of authentication and encryption processes to the tags requires that long messages and tag identifiers be used. Any method that reduces the time to identify a given tag will enhance system performance.

Thus, a system and method have been provided for rapidly identifying tags in a field. Collisions are also dramatically reduced as a result of using the method and apparatus of the preferred embodiment described above.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An RFID system comprising:
an RFID reader configured to issue a first RF command requesting that RF tags identify themselves, a subsequent second RF command, and timing information defining a plurality of timeslots; and
a plurality of RF tags in selective communication with the reader, the RF tags having respective IDs, respective tags being configured to randomly select a timeslot in which to reply to the first RF command, and to issue a first RF reply in response to the first RF command in the randomly selected timeslot, the first RF reply incompletely identifying the tag to the reader, the respective tags being further configured to issue a second RF reply in response to the second RF command to more completely identify the tag to the reader;
wherein the reader is configured to store data representing the timeslot in which an RF reply was received by the reader and wherein the second RF command indicates the timeslot for which a reply was received from a tag.

2. An RFID system in accordance with claim 1 wherein the RFID reader is configured to monitor a plurality of frequencies for a response, wherein respective RF tags are configured to randomly select a frequency on which to issue a reply to the RF command, and to issue the first RF reply using the randomly selected frequency.

3. An RFID system in accordance with claim 2 wherein the reader is configured to store data representing the timeslot and intermediate frequency in which an RF reply was received by the reader and the second RF command indicates the timeslot and intermediate frequency for which a reply was received from a tag.

4. An RFID system in accordance with claim 1 wherein the system is a backscatter system, wherein the reader is configured to provide RF illumination after issuing the first RF command, and wherein the reader defines the timeslots by interrupting illumination.

5. An RFID system in accordance with claim 4 wherein the tags are configured to reply to the reader using On-Off Keying.

6. An RFID system in accordance with claim 1 wherein a frequency pattern included in the first RF reply consists essentially of a single frequency.

7. An RFID system in accordance with claim 1, wherein respective RF tags are configured to transmit their IDs to the reader in response to the second RF command from the reader.

8. An RFID reader, for use with RF tags that have respective IDs, the RFID reader comprising:

circuitry configured to selectively provide a backscatter RF illumination field, to provide time synchronization information defining timeslots to RF tags, to issue a first RF command requesting that RF tags identify themselves, to store the identity of the timeslot where an RF reply was received by the reader from a tag, to determine if a collision occurred between RF replies, to issue a second RF command indicating the timeslot for which a reply was received from an RF tag and requesting that RF tags reply with their IDs, to receive and store IDs from RF tags, and to re-issue the first RF command response if it was determined that a collision occurred between RF replies.

9. An RFID reader in accordance with claim 8 wherein the reader is configured to monitor a plurality of different frequencies for replies in multiple different timeslots, and to store the frequency where an RF reply was received by the reader from a tag, and wherein the second RF command further indicates the frequency for which a reply was received.

10. An RFID reader in accordance with claim 8 wherein the reader defines the timeslots by interrupting illumination.

11. An RFID reader in accordance with claim 8 and further configured to receive and decode On-Off Keyed responses from RF tags.

12. An RFID tag for use with a reader that is configured to issue timing signals defining timeslots, the RFID tag comprising:

circuitry configured to store an ID identifying the tag, to backscatter modulate an RF illumination field from a reader, to randomly select a timeslot in which to reply from a plurality of possible timeslots, to issue an RF reply in the selected timeslot, responsive to receiving a first RF command including a session identifier from the reader, the reply including a signal pattern, the signal pattern identifying the tag but not including the entire ID, the tag being further configured to issue a subsequent response to the reader including the tag's ID in response to receiving a second RF command from the reader, the second RF command containing information corresponding to the selected timeslot to indicate that the tag has been found by the reader, and the circuitry being further configured to ignore further receptions of the first RF command which include the session identifier responsive to receiving a third RF command from the reader confirming that the tag's ID has been received by the reader.

13. An RFID tag in accordance with claim 12 wherein the circuitry is further configured to randomly select a frequency in which to reply from a plurality of possible frequencies.

14. An RFID tag in accordance with claim 12 wherein the signal pattern comprises a frequency pattern.

15. An RFID tag in accordance with claim 12 wherein the signal pattern comprises a TONE.

16. An RFID) tag in accordance with claim 12 wherein the signal pattern consists essentially of a TONE.

17. An RFID tag in accordance with claim 12 and configured to recognize an interruption of RF illumination from the reader as a transition between timeslots.

18. An RFID tag in accordance with claim 12 and configured to reply to the reader using On-Off Keying.

19. An RFID communications method comprising:
providing an RF reader;
providing a plurality of RF tags in selective communication with the reader, the RF tags having respective IDs;
issuing, using the RF reader, an RF command requesting that the RF tags identify themselves;
issuing, using the RF reader, timing information defining a plurality of timeslots;
respective tags randomly selecting a timeslot in which to reply to the RF command;
respective tags issuing an RF reply in response to the RF command, in the randomly selected timeslot, the RF reply including a frequency pattern to assist in identifying the tag but not the tag's entire ID, different tags having different frequency patterns;
storing, with the reader, the timeslot where an RF reply was received by the reader; and
transmitting, with the reader, an RF message indicating the timeslot for which a reply was received from a tag.

20. An RFID communication method in accordance with claim 19 and further comprising monitoring, with the RF reader, a plurality of frequencies for a response, wherein respective tags randomly select a frequency on which to issue a reply to the RF command, and wherein respective tags issuing an RF reply comprises respective tags issuing an RF reply in response to the RF command, in the randomly selected timeslot and using the randomly selected frequency.

21. An RFID communication method in accordance with claim 20 and further comprising storing, with the reader, the timeslot and frequency where an RF reply was received by the reader, and transmitting, with the reader, an RF message indicating the timeslot and frequency for which a reply was received from a tag.

22. An RFID communication method in accordance with claim 20 and further comprising transmitting, from respective RF tags, the tag's ID to the reader in response to the RF message from the reader, on a newly randomly selected one of the frequencies.

23. An RFID communication method in accordance with claim 19 and further comprising providing, with the reader, RF backscatter illumination after issuing the RF command.

24. An RFID communication method in accordance with claim 19 and further comprising defining, with the reader, the timeslots by interrupting illumination.

25. An RFID communication method in accordance with claim 19 and further comprising defining the frequency pattern included in the RF reply using a single frequency.

26. An RFID communication method in accordance with claim 19 and further comprising respective tags replying to the reader using On-Off Keying.

27. A method of communicating with RF tags that have respective IDs, the method comprising:
selectively providing a backscatter RF illumination field, including time synchronization information defining timeslots to RF tags;
issuing a first RF command requesting that RF tags identify themselves;
storing data identifying the timeslot where an RF reply was received from a tag;
determining if a collision occurred between RF replies;
issuing a second RF command indicating the timeslot for which a reply was received from an RF tag and requesting that RF tags reply with their IDs;
receiving and storing IDs from RF tags; and
re-issuing the first RF command response if it was determined that a collision occurred between RF replies received from tags.

28. A method of communicating with RF tags in accordance with claim 27 and further comprising monitoring a plurality of different frequencies for replies in multiple different timeslots; and storing the frequency where an RF reply was received from a tag, and wherein issuing a second RF command comprises indicating the frequency for which a reply was received from an RF tag.

29. A method of communicating with RF tags in accordance with claim 27 and comprising providing the RF illumination field after issuing the first RF command and after issuing the second RF command.

30. A method of communicating with RF tags in accordance with claim 27 and further comprising defining the timeslots by interrupting illumination.

31. A method of communicating with RF tags in accordance with claim 27 and further comprising receiving and decoding On-Off Keyed responses from RF tags.

32. A method of communicating with an RF reader that is configured to issue timing signals defining timeslots, the method comprising:
    storing an ID;
    backscatter modulating an RF illumination field from the reader;
    randomly selecting a timeslot in which to reply from a plurality of possible timeslots;
    issuing an RF reply in the selected timeslot, responsive to receiving a first RF command, including a session identifier, from the reader, the reply including a signal pattern, the signal pattern identifying the tag but not including the entire ID;
    issuing a response to the reader including the ID in response to receiving a subsequent second RF command from the reader that contains information corresponding to the selected timeslot; and
    ignoring further receptions of the first RF command which include the session identifier responsive to receiving a third RF command from the reader confirming that the ID has been received by the reader.

33. A method of communicating with an RF reader in accordance with claim 32 and further comprising randomly selecting a frequency in which to reply from a plurality of possible frequencies.

34. A method of communicating with an RF reader in accordance with claim 32 wherein the signal pattern comprises a frequency pattern.

35. A method of communicating with an RF reader in accordance with claim 32 wherein the signal pattern comprises a predetermined frequency.

36. A method of communicating with an RF reader in accordance with claim 32 wherein the signal pattern comprises a TONE.

37. A method of communicating with an RF reader in accordance with claim 32 wherein the signal pattern consists essentially of a TONE.

38. A method of communicating with an RF reader in accordance with claim 32 and further comprising recognizing an interruption of RF illumination from the reader as a transition between timeslots.

39. A method of communicating with an RF reader in accordance with claim 32 and further comprising replying to the reader using On-Off Keying.

40. A method of using an RFIT) reader, comprising:
    issuing a first RF command to an RF tag;
    selectively providing an RF illumination field including time synchronization pulses;
    monitoring for a reply during a period defined by a predetermined number of timeslots;
    receiving an RF reply, from a tag, including a signal pattern during the monitoring;
    issuing a second RF command indicating the timeslot during which a reply was received;
    receiving an RF reply including a tag's ID in response to the second RF command; and
    issuing a third RF command in response to receiving an RF reply including a tag's ID.

41. A method of using an RFID reader in accordance with claim 40 and further comprising simultaneously monitoring a number of pre-defined frequencies during the period defined by a pre-defined number of timeslots, and wherein issuing the second RF command further comprises indicating the frequency and timeslot during which a reply was received.

42. A method of using an RFID reader in accordance with claim 40 and further comprising detecting an RF collision in responses from tags, during the monitoring.

43. A method of using an RFID reader in accordance with claim 42 and further comprising re-issuing the first RF command subsequent to the detecting.

44. An RFID system comprising:
    an RFID reader including means for issuing an RF command requesting that RF tags identify themselves, means for issuing timing information defining a plurality of timeslots, and means for monitoring a plurality of frequencies for a response; and
    a plurality of RF tags in selective communication with the reader, the RF tags having respective IDs, respective tags including means for randomly selecting a timeslot in which to reply to the RF command, means for randomly selecting a frequency on which to issue a reply to the RF command, and means for issuing an RF reply in response to the RF command in the randomly selected timeslot and using the randomly selected frequency, the RF reply including a frequency pattern that incompletely identifies the tag to the reader;
    wherein the reader includes means for storing data representing the timeslot and frequency in which an RF reply was received by the reader and is configured to transmit an RF message indicating the timeslot and frequency for which a reply was received from a tag.

45. An RFID system in accordance with claim 44 wherein the system is a backscatter system, and wherein the reader includes means for providing RF illumination after issuing the RF command.

46. An RFID system in accordance with claim 44 wherein the means for issuing timing information defining the timeslots comprises means for defining timeslots by interrupting illumination.

47. An RFID system in accordance with claim 44 wherein the frequency pattern included in the RF reply consists essentially of a single frequency.

48. An RFID system in accordance with claim 44 wherein the tags include means for replying to the reader using On-Off Keying.

49. An RFID system in accordance with claim 44, wherein respective RF tags include means for transmitting its ID to the reader in response to the RF message from the reader.

* * * * *